United States Patent
Morimoto et al.

(10) Patent No.: US 6,992,264 B2
(45) Date of Patent: Jan. 31, 2006

(54) WELDING METHOD AND WELDING POWER SUPPLY APPARATUS

(75) Inventors: Takeshi Morimoto, Osaka (JP); Hideo Ishii, Osaka (JP)

(73) Assignee: Sansha Electric Manufacturing Company, Limited, Osaka (JP)

( * ) Notice: Subject to any disclaimer, the term of this patent is extended or adjusted under 35 U.S.C. 154(b) by 147 days.

(21) Appl. No.: 10/647,551

(22) Filed: Aug. 25, 2003

(65) Prior Publication Data

US 2004/0040945 A1 Mar. 4, 2004

(30) Foreign Application Priority Data

Aug. 27, 2002 (JP) ...................................... 2002-246087

(51) Int. Cl.
*B23K 9/09* (2006.01)

(52) U.S. Cl. ................................. 219/130.51
(58) Field of Classification Search ............ 219/130.51, 219/130.5, 137 PS
See application file for complete search history.

(56) References Cited

U.S. PATENT DOCUMENTS 5,283,419 A * 2/1994 Hagiwara et al. ...... 219/130.51

FOREIGN PATENT DOCUMENTS

| JP | 62-61779 A | * | 3/1987 |
| JP | 2543269 | | 10/1996 |
| JP | 2543270 | | 10/1996 |

* cited by examiner

Primary Examiner—Clifford C. Shaw
(74) Attorney, Agent, or Firm—Duane Morris LLP

(57) ABSTRACT

An IGBT (16) intermittently interrupts a current from a positive terminal (12P) of a DC supply (2) to a workpiece (24). An IGBT (20) intermittently interrupts a current from a negative terminal (12N) of the DC supply (2) to the workpiece (24). A control circuit (32) and a drive signal generating circuit (34) ON-OFF control the IGBTs (16, 20). The control circuit (32) causes the drive signal generating circuit (34) to control the IGBTs (16, 20) in such a manner as to provide a repetition of a cycle consisting of an AC period during which the IGBTs (16, 20) are alternately rendered conductive, and a DC period following the AC period during which the IGBT (16) is rendered continuously conductive. Further, the control circuit (32) and the drive signal generating circuit (34) simultaneously render the IGBT (16) and the IGBT (20) nonconductive and conductive, respectively, at least once during the DC period, and, thereafter, simultaneously render the IGBT (16) and the IGBT (20) conductive and nonconductive, respectively.

7 Claims, 3 Drawing Sheets

WELDING METHOD AND WELDING POWER SUPPLY APPARATUS

This invention relates to a method for welding workpieces of such materials, e.g. aluminum and magnesium, that it is necessary to remove oxide films covering the surfaces of the workpiece, and also to a welding power supply apparatus for use in practicing the welding method.

BACKGROUND OF THE INVENTION

Japanese Patent Nos. 2,543,269 and 2,543,270 both registered on Jul. 25, 1996 disclose techniques which may be used for welding such workpieces as described above. According to these Japanese patents, a power supply is connected to a welder electrode and a workpiece for supplying current to them. One cycle of the current includes an AC current period during which an AC current is supplied and a DC current period following the AC current period, and the cycle is repeated. During the DC current period, a DC current flows from the workpiece to the welder electrode. According to Pat. No. 2,543,269, the proportion of the AC current period in one cycle period, i.e. the AC current period plus the DC current period, is from 30% to 80%.

According to the techniques disclosed in these Japanese patents, the surface of a workpiece of aluminum, for example, is purified of an oxide film covering the surface during the AC current period and, particularly, during part of the AC current period in which the workpiece is at a negative potential. Also, according to these techniques, since the polarity of the welding current is not inverted during the DC current period, during which the workpiece is at a positive potential, no noise which would otherwise be generated by high harmonics is generated, resulting in reduction of arcing sound.

Sometimes, the proportion of the DC current period in one cycle is increased to a value greater than from 70% to 20% of one cycle in order to effect deep welding of the workpiece. In this case, the workpiece is welded by DC arcing before the surface of the workpiece is sufficiently purified of the oxide film thereon because of shortened AC current period. As a result, slag may be introduced into the melt of the workpiece, which may produce defects in the welded portion.

An object of the present invention is to provide a welding method which can effect welding with reduced welding defects, and also a power supply apparatus for use in practicing such welding method.

SUMMARY OF THE INVENTION

In a welding method according to the present invention, a welding current is caused to flow between a workpiece to be welded and a welding electrode. The welding current is formed of a periodic repetition of a cycle consisting of an AC waveform portion and a DC waveform portion succeeding the AC waveform portion. The DC waveform is such as to cause a current to flow from the workpiece to the welding electrode. At least one pulse of current is inserted in the DC waveform. This current pulse has a polarity opposite to that of the DC waveform.

With this welding method according to the present invention, the AC waveform portion of the welding current purifies the workpiece, and the succeeding DC current waveform provides stable arcing. In addition, the opposite polarity pulse current temporarily supplied during the DC current portion prevents slag from being blown into the molten metal of the workpiece.

The at least one temporarily supplied current pulse may be a plurality of current pulses. All or part of the plural current pulses are spaced from each other regularly or randomly.

A power supply apparatus for use in practicing the welding method includes a DC power supply. The DC power supply has positive and negative terminals and is capable of supplying to a welding load formed of the welding electrode and the workpiece, a positive current from the positive terminal and a negative current from the negative terminal. The DC power supply may include an AC-to-DC converter for converting an AC voltage from an AC supply into a DC voltage, a high-frequency converter for converting the DC voltage into a high-frequency voltage, a transformer for voltage-transforming the high-frequency voltage, and a high-frequency-to-DC converter for converting the high-frequency voltage from the transformer into a DC voltage in such a manner that positive and negative voltages can be developed at the positive and negative terminals, respectively. A first semiconductor switching device is used to intermittently interrupt the current supplied from the positive terminal to the welding load, and a second semiconductor switching device is used to intermittently interrupt the current supplied from the negative terminal to the welding load. Each of the first and second semiconductor switching devices may be a device which has a control electrode and is rendered conductive when a control signal is being applied to the control electrode, such as a bipolar transistor, a FET or an IGBT. Control means ON-OFF controls the first and second semiconductor switching devices. The control means controls the first and second semiconductor switching devices in such a manner as to provide a repetition of a cycle consisting of an AC period and a positive DC period following the AC period. During the AC period, the first and second semiconductor switching devices are alternately rendered conductive, and during the positive DC period, the first semiconductor switching device is rendered continuously conductive. The positive DC period may be longer than the AC period. The control means operates to insert at least one negative pulse period into the positive DC period, by first rendering the first and second semiconductor switching devices nonconductive and conductive, respectively, and, then, rendering the first and second semiconductor devices conductive and nonconductive, respectively.

With the above-described power supply apparatus, welding like the one effected by the above-described welding method can be realized. A plurality of negative pulse periods may be inserted, and all or part of the negative pulse periods may be spaced regularly or randomly.

A first reactor may be connected between the positive terminal and the first semiconductor switching device, with a second reactor connected between the negative terminal and the second semiconductor switching device. The first and second reactors are formed of windings wound on the same core in such a manner that voltages in opposite directions can be induced therein.

During the positive current period, when the apparatus switches from a state in which the first semiconductor switching device is conductive to cause a positive current to flow through the first reactor to the workpiece, to a state in which the first semiconductor switching device is rendered nonconductive and the second semiconductor switching device is rendered conductive, to thereby cause a negative current to flow through the second reactor to the workpiece, the voltage induced in the first reactor causes a voltage of opposite polarity to be induced in the second reactor. Since the voltage induced in the first reactor is of a polarity to cause a positive current to flow to the workpiece, the voltage induced in the second reactor has such a polarity as to provide a negative current to the workpiece. Accordingly, when the polarity of the current changes, the voltage induced in the second reactor acts to superpose a negative current on the negative current supplied from the negative terminal through the second reactor. As a result, the transition from the positive current to the negative current is effected smoothly. A similar operation takes place when the second semiconductor switching device is rendered nonconductive and, at the same time, the first semiconductor switching circuit is rendered conductive.

DESCRIPTION OF EMBODIMENT

Figure 1:
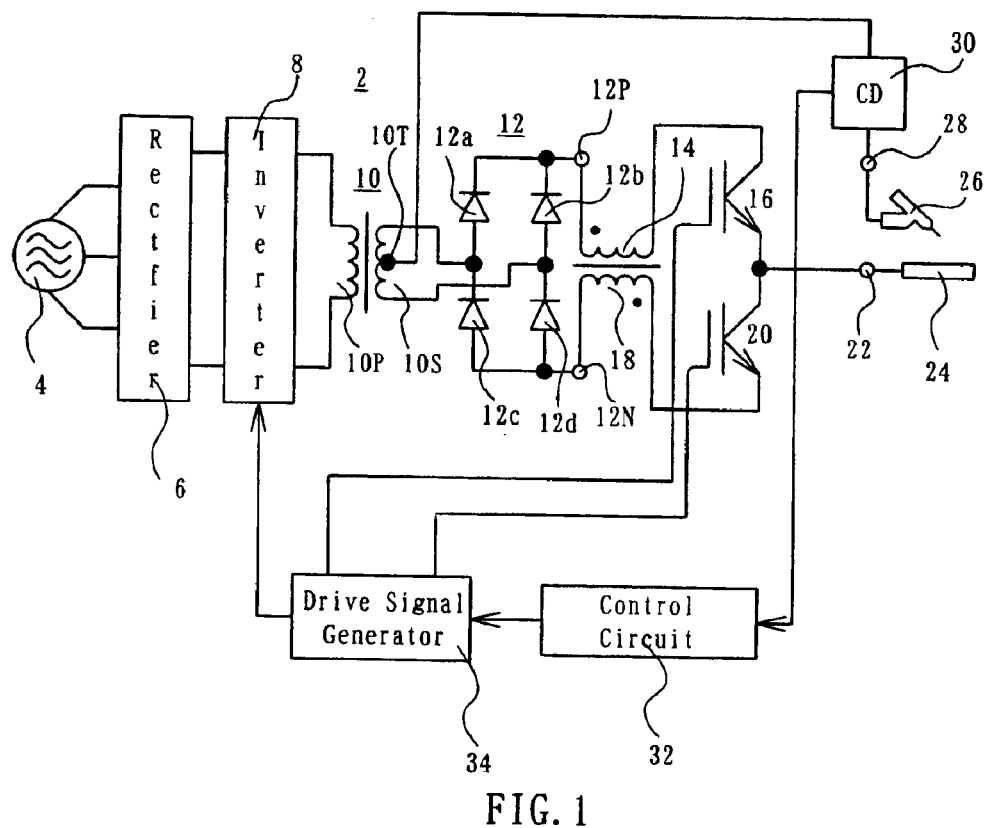
FIG. 1 is a block circuit diagram of a welding power supply apparatus according to one embodiment of the present invention.

A welding power supply apparatus according to one embodiment of the present invention shown in FIG. 1 may be used for TIG welding, and includes a DC power supply 2.

The DC power supply 2 includes a rectifying circuit 6, which rectifies an AC voltage from, for example, a commercial AC supply 4. A rectified output from the rectifying circuit 6 is applied to DC-to-high-frequency converting means, e.g. an inverter 8, where it is converted into a high-frequency voltage.

The high-frequency voltage is then applied to a primary winding 10P of a transformer 10. A secondary winding 10S of the transformer 10 is provided with an intermediate tap 10T. A high-frequency voltage induced in the secondary winding 10S is rectified in a rectifying circuit 12. The rectifying circuit 12 includes diodes 12a, 12b, 12c and 12d. The diode 12a has its anode connected to one end of the secondary winding 10S, and the diode 12b has its anode connected to the other end of the secondary winding 10S. The junction of the cathodes of the diodes 12a and 12b provides a positive output terminal of the rectifying circuit 12. This positive output terminal provides a positive output terminal 12P of the DC power supply 2. The diode 12c has its cathode connected to the one end of the secondary winding 10S, and the diode 12d has its cathode connected to the other end of the secondary winding 10S. The junction between the anodes of the diodes 12c and 12d provides a negative output terminal of the rectifying circuit 12, which forms a negative output terminal 12N of the DC power supply 2.

When voltages, which are positive relative to the intermediate tap 10T, are developed at the opposite ends of the secondary winding 10S, a positive current flows from the diodes 12a and 12b through the positive terminal 12P, and a circuit described in detail later, to the intermediate tap 10T. When voltages, which are negative relative to the intermediate tap 10T, are developed at the opposite ends of the secondary winding 10S, a negative current flows from the diodes 12c and 12d, through the negative terminal 12N, and a circuit described in detail later, to the intermediate tap 10T.

The positive output terminal 12P is connected through a first reactor, e.g. a smoothing reactor 14, to a semiconductor switching device, e.g. to the collector of an IGBT 16. Similarly, the negative output terminal 12N is connected through a second reactor, e.g. a smoothing reactor 18, to a semiconductor switching device, e.g. to the emitter of an IGBT 20. The emitter of the IGBT 16 and the collector of the IGBT 20 are connected together to a workpiece 24 through a workpiece terminal 22 adapted to be connected to the workpiece 24. The workpiece 24 is made of, for example, aluminum having an oxide film thereon.

The smoothing reactors 14 and 18 are wound on the same core in such a manner that, when a voltage of one polarity is induced in one of the reactors, a voltage of opposite polarity can be induced in the other reactor, vice versa.

A welding electrode, e.g. a torch 26, is connected to a welding electrode terminal 28. An arc is to be generated between the torch 26 and the workpiece 24. The welding electrode terminal 28 is connected to the intermediate tap 10T on the secondary winding 10S through a current detector (CD) 30.

The current detector 30 detects a welding current flowing through the torch 26 and the workpiece 24 and develops a welding current representative signal representing the detected welding current. The welding current representative signal is applied to a control circuit 32, which may be, for example, a microcomputer. The control circuit 32 provides a drive signal generating circuit 34 with such a control command as to make the welding current representative signal have a predetermined value. In response to the control command, the drive signal generating circuit 34 provides the inverter 8 with a drive signal. Thus, the inverter 8 is constant-current controlled.

Further, the control circuit 32 operates to provide the drive signal generating circuit 34 with such a control command as to make the drive signal generating circuit 34 generate a drive signal to control the conduction of the IGBTs 16 and 20.

Figure 2:
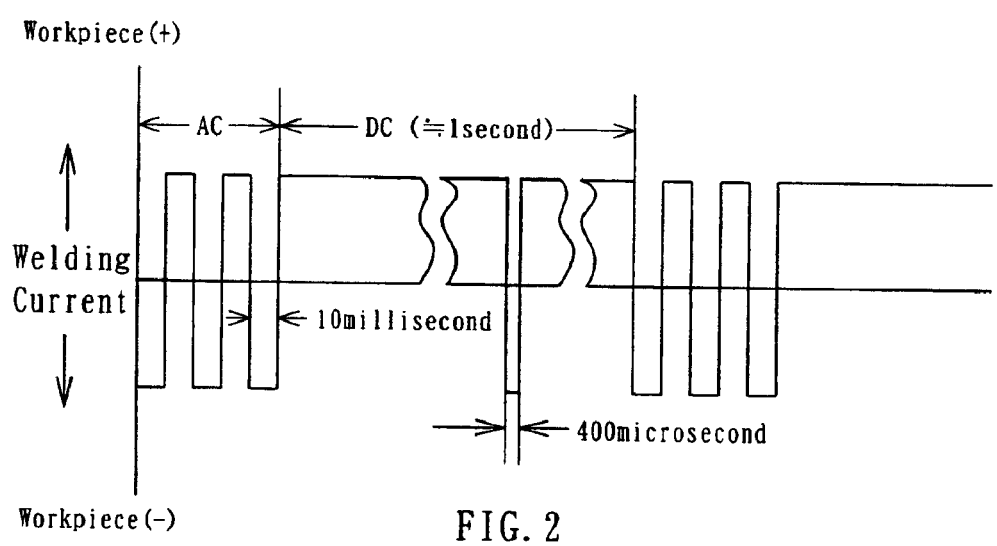
FIG. 2 exemplifies a waveform of a welding current supplied by the power supply apparatus of FIG. 1.

Specifically, as shown in FIG. 2, the control circuit 32 operates to make an AC period continue for a predetermined time. In the AC period, the workpiece terminal 22 assumes alternately positive and negative potentials. In the AC period, positive and negative current pulses each having a time period of, for example, 10 milliseconds flow alternately. A positive DC period follows the AC period. In this DC period, a DC current is provided for a period of from 0.1 seconds to 1 second, for example, for 1 second. The DC current is made to flow from the workpiece 24 to the torch 26. One such AC period and one such DC period constitute one cycle, and such cycle is repeated.

When a given time period, for example, about one half of the DC period or about 0.5 seconds in the illustrated example, passes after the beginning of the DC period, at least one negative pulse is inserted into the DC period. When the negative pulse is inserted, the workpiece terminal 22 is placed at a negative potential and the welding electrode terminal 28 is positive. The duration of the one negative pulse is from 300 microseconds ($\mu$s) to 500 microseconds, e.g. 400 microseconds.

Figure 3:
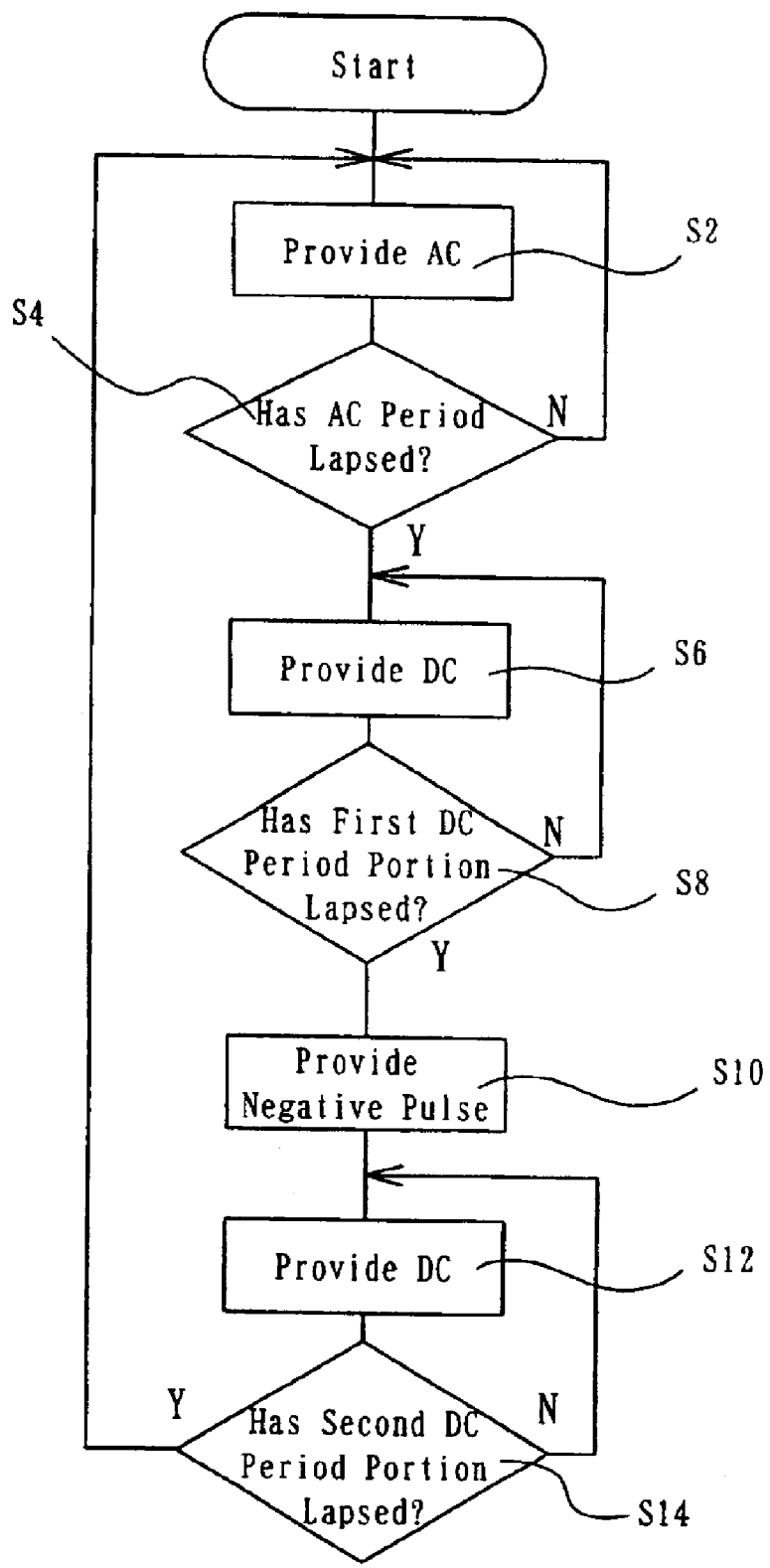
FIG. 3 is a flow chart of operation of the power supply apparatus of FIG. 1.

For performing the control described above, the control circuit 32 operates in a manner as shown in FIG. 3. First, an AC providing period is started (Step S2). More specifically, the control circuit 32 gives such a command to the drive signal generating circuit 34 as to alternately render the IGBTs 16 and 20 conductive for ten (10) milliseconds. Then, the control circuit 32 makes a judgment as to whether or not a predetermined time period of the AC providing period has passed (Step S4). If the AC providing period has not yet lapsed, Steps S2 and S4 are repeated in loop until the AC providing period lapses. During the AC providing period, an AC pulsating current having its polarity alternating between positive and negative is supplied to flow between the workpiece 24 and the torch 26, which purifies the workpiece 24 of the oxide film thereon.

When the control circuit 32 judges, in Step S4, that the AC providing period has lapsed, a DC providing period is then started (Step S6). Specifically, the control circuit 32 gives such a command to the drive signal generating circuit 34 as to render the IGBT 16 conductive and render the IGBT 20 nonconductive, whereby a voltage is applied to the workpiece 24 and the torch 26 in such a polarity that the workpiece 24 is positive and the torch 26 is negative. This concentrates the arc so that a narrow-width, deeply extending bead can be formed in the workpiece 24.

Following the start of the DC providing period, the control circuit 32 makes a judgment as to whether a first portion of the DC providing period has passed (Step S8). In other words, the control circuit 32 operates to judge whether or not the first DC providing period portion of, for example, one half, i.e. 0.5 seconds, of the predetermined DC providing period of 1 second has passed after the beginning of the DC providing period. If the judgment made by the control circuit 32 is NO, that is, if the first DC providing period portion has not lapsed yet, the control circuit 32 repeats Steps S6 and S8 until the first DC providing period portion lapses.

If the control circuit 32 judges that the first DC providing period portion has lapsed, it, then, starts a negative pulse providing operation (Step S10). Specifically, the control circuit 32 gives such a command to the drive signal generating circuit 34 that the IGBTs 16 and 20 can be rendered nonconductive and conductive, respectively, for a time period of 400 microseconds. This places the workpiece terminal 22 at a negative potential with the welding electrode terminal 28 being positive relative to the workpiece electrode 22.

After that, the DC providing period is resumed. That is, the remaining, second portion of the DC providing period is started (Step S12). Specifically, as in Step S6, the control circuit 32 gives such a command to the drive signal generating circuit 34 that the IGBTs 16 and 20 can be rendered conductive and nonconductive, respectively.

Then, the control circuit 32 makes a judgment as to whether the second DC providing period portion has lapsed or not (Step S14). If the second DC providing period portion has not lapsed yet, the control circuit 32 repeats the execution of Steps S12 and S14 in loop until the second DC providing period portion lapses. When the control circuit 32 judges that the second portion of the DC providing period has lapsed, the control circuit 32 repeats the execution of the steps by executing Step S2 to start the AC providing period.

If it is desired that a plurality of negative pulses be inserted in succession in the negative pulse providing operation, steps similar to Steps S2 and S4 may be substituted for Step S12. In this case, however, the AC providing period is shorter than the corresponding AC providing period in Step S4.

Since a current is caused to flow temporarily from the torch 26 to the workpiece 24 during the DC providing period, an oxide film portion, if any, which could not be removed during the AC providing period can be prevented from being blown into the molten metal of the workpiece 24.

The smoothing reactors 14 and 18 of the above-described power supply apparatus are wound on the same core in such a manner that, when a voltage is induced in the smoothing reactor 14, a voltage of opposite polarity can be induced in the smoothing reactor 18, and vice versa.

Accordingly, when such a drive signal as to simultaneously render the IGBTs 16 and 20 nonconductive and conductive, respectively, is applied during the AC providing period, a voltage causing a current to flow toward the IGBT 16 is induced in the reactor 14 due to the non-conduction of the IGBT 16, and, at the same time, a voltage of opposite polarity, i.e. a voltage causing a current to flow from the emitter of the IGBT 20 toward the negative output terminal 12N, is induced in the smoothing rector 18. Therefore, when the IGBT 20 is made conductive, the voltage induced in the reactor 18 is superposed on the DC voltage developed between the negative output terminal 12N and the intermediate tap 10T, and the combined voltage is applied between the collector and emitter of the IGBT 20 to render the IGBT 20 promptly.

Similarly, when a drive signal is applied to render the IGBT 20 nonconductive and, at the same time, render the IGBT 16 conductive, the voltage induced in the reactor 14 is superposed on the DC voltage developed between the positive output terminal 12P and the intermediate tap 10T, and the combined voltage is applied between the collector and emitter of the IGBT 16. This renders the IGBT 16 conductive promptly. In other words, by virtues of the voltages induced in the reactors 14 and 18, the switching of the polarity of the welding current can be done smoothly during the AC providing period, which avoids interruption in the arcing.

Figure 4:
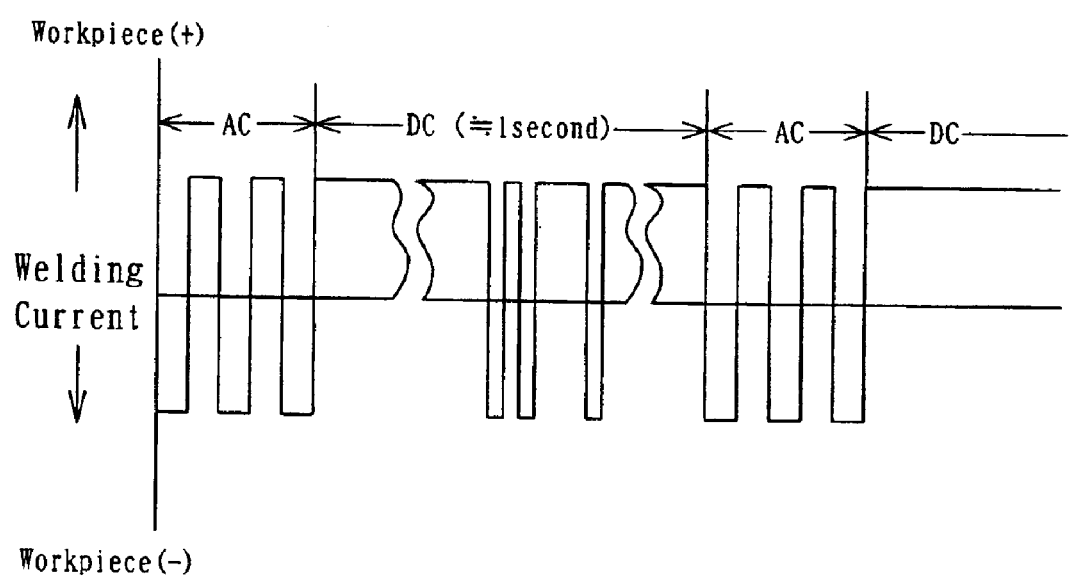
FIG. 4 shows another example of the waveform of the welding current supplied by the power supply apparatus of FIG. 1.

The present invention has been described as having only one negative pulse inserted in the DC providing period as shown in FIG. 2 or having a succession of negative pulses inserted in the DC providing period. Insertion of a plurality of negative pulses at random or irregular intervals as shown in FIG. 4, can provide not only an effect of preventing slag from being blown into the molten metal, but an additional effect of further preventing the oxide film from being dissolved into the molten metal since the negative pulses are added at randomly chosen locations in the DC providing period. In the example illustrated in FIG. 4, three negative pulses are inserted in the DC providing period. Two of the negative pulses are added with a spacing equal to the pulse width, but the remaining one is spaced from the second negative pulse by a different amount. However, it should be noted that more than three pulses may be inserted. Also, part or all of such pulses may be disposed randomly. In other example, all of the pulses may be disposed at regular intervals which, however, are not equal to the width of the pulses.

Although the DC power supply 2 has been described to be formed of the rectifying circuit 6, the inverter 8 and the rectifying circuit 12, other arrangement may be employed instead.

What is claimed is:

1. A welding method comprising the steps of:
   causing a welding current to flow between a workpiece and an welding electrode, said welding current having a waveform including a periodic repetition of a cycle consisting of an AC current portion during which an AC current is supplied and a DC current portion following the AC current during which a DC current is supplied, said AC current portion consisting of a positive polarity portion of a given time period during which said current is positive, and a negative portion of said given time period during which said current is negative; and inserting at least one current pulse of polarity opposite to the polarity of said DC current during said DC current portion, said opposite polarity pulse having a time period shorter than said given time period of said positive and negative polarity portions;

said DC current flowing from said workpiece to said welding electrode.

2. The welding method according to claim 1 wherein said at least one current pulse comprises a plurality of regularly spaced pulses.

3. The welding method according to claim 1 wherein said at least one current pulse comprises a plurality of pulses with at least one of said pulses spaced from other pulses by a different amount.

4. A power supply apparatus for use in welding, comprising:

a DC power supply having positive and negative terminals and being adapted to supply a welding load including a welding electrode and a workpiece with a positive current from said positive terminal and with a negative current from said negative terminal;

a first semiconductor switching device operative to intermittently interrupt the current supplied from said positive terminal to said welding load;

a second semiconductor switching device operative to intermittently interrupt the current supplied from said negative terminal to said welding load; and control means for controlling the ON-OFF operation of said first and second semiconductor switching devices;

wherein said control means operates to control said first and second semiconductor switching devices in such a manner as to provide a repetition of a cycle consisting of an AC period during which said first and second semiconductor switching devices are alternately rendered conductive for a given time period, and a positive DC period following said AC period during which said first semiconductor switching device is rendered continuously conductive; and said control means forms a negative pulse period in said positive DC period by rendering said first and second semiconductor switching devices nonconductive and conductive, respectively, at least once during said DC period for a time period shorter than said given time period.

5. The power supply apparatus according to claim 4 wherein a plurality of such negative pulse periods are disposed at regular intervals.

6. The power supply apparatus according to claim 4 wherein a plurality of such negative pulse periods are disposed with at least one of said negative pulse periods spaced from other negative pulse periods by a different amount.

7. The power apparatus according to claim 4 further comprising:

a first reactor connected between said positive terminal and said first semiconductor switching device; and a second reactor connected between said negative terminal and said second semiconductor switching device;

said first and second reactors being wound on a same core in such a manner that voltages of opposite polarities can be induced therein.

\* \* \* \* \*